(12) United States Patent
Fan et al.

(10) Patent No.: US 9,713,032 B2
(45) Date of Patent: Jul. 18, 2017

(54) TRANSMISSION OF A RANDOM ACCESS RESPONSE MESSAGE

(71) Applicant: Telefonaktiebolaget L M Ericsson (publ), Stockholm (SE)

(72) Inventors: Rui Fan, Beijing (CN); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 14/786,181

(22) PCT Filed: Apr. 22, 2013

(86) PCT No.: PCT/SE2013/050428
§ 371 (c)(1),
(2) Date: Oct. 22, 2015

(87) PCT Pub. No.: WO2014/175788
PCT Pub. Date: Oct. 30, 2014

(65) Prior Publication Data
US 2016/0073292 A1    Mar. 10, 2016

(51) Int. Cl.
*H04W 4/00* (2009.01)
*H04W 28/06* (2009.01)
*H04W 74/00* (2009.01)
*H04L 12/801* (2013.01)
*H04W 74/08* (2009.01)

(52) U.S. Cl.
CPC ............ *H04W 28/06* (2013.01); *H04L 47/12* (2013.01); *H04W 74/006* (2013.01); *H04W 74/0833* (2013.01)

(58) Field of Classification Search
None
See application file for complete search history.

(56) References Cited

U.S. PATENT DOCUMENTS

2010/0040001 A1* 2/2010 Montojo ............... H04W 72/04
370/329
2010/0085926 A1* 4/2010 Harada ............... H04W 28/065
370/329

(Continued)

FOREIGN PATENT DOCUMENTS

WO   WO 2007/091831 A2   8/2007
WO   WO 2012/177060 A2   12/2012

OTHER PUBLICATIONS

PCT Written Opinion of the International Searching Authority for International application No. PCT/SE2013/050428, Jan. 10, 2014.

(Continued)

*Primary Examiner* — Bob Phunkulh
(74) *Attorney, Agent, or Firm* — Baker Botts, LLP

(57) ABSTRACT

Disclosed are methods as well radio network nodes suitable for transmission 02 of a random access response message (e.g. RA MSG2) during a random access procedure. A method implemented by a radio network node, such as an evolved NodeB 20, may include generating a first MAC RAR (Medium Access Control Random Access Response) as well as generating a successive MAC RAR. The successive MAC RAR may be generated by differentially coding one or more bits of a field of the successive MAC RAR to produce a compressed successive MAC RAR.

15 Claims, 6 Drawing Sheets

(56) References Cited

U.S. PATENT DOCUMENTS

| | | | | |
|---|---|---|---|---|
| 2010/0165943 A1* | 7/2010 | Kato | ................... | H04W 8/26 |
| | | | | 370/329 |
| 2011/0045837 A1* | 2/2011 | Kim | ................ | H04W 74/0833 |
| | | | | 455/452.1 |
| 2011/0261763 A1* | 10/2011 | Chun | ................ | H04W 74/008 |
| | | | | 370/329 |
| 2011/0305197 A1* | 12/2011 | Park | ................... | H04L 1/1812 |
| | | | | 370/328 |
| 2012/0044897 A1* | 2/2012 | Wager | ................ | H04L 1/0039 |
| | | | | 370/329 |
| 2013/0114515 A1* | 5/2013 | Koo | ................... | H04J 11/0023 |
| | | | | 370/329 |
| 2013/0195030 A1* | 8/2013 | Wittberg | ........... | H04W 72/0446 |
| | | | | 370/329 |
| 2015/0023281 A1* | 1/2015 | Wu | ................... | H04W 52/146 |
| | | | | 370/329 |
| 2015/0312798 A1* | 10/2015 | Rune | ................. | H04W 4/005 |
| | | | | 370/236 |

OTHER PUBLICATIONS

PCT Notification of Transmittal of the International Search Report and the Written Opinion of the International Searching Authority, or the Declaration for International application No. PCT/SE2013/050428, Jan. 10, 2014.

3GPP TSG-RAN WG2 #77; Dresden, Germany; Source: Ericsson, ST Ericsson; Title: Random Access Response for an SCell (Tdoc R2-120481), Feb. 6-10, 2012.

* cited by examiner

TRANSMISSION OF A RANDOM ACCESS RESPONSE MESSAGE

PRIORITY

This nonprovisional application is a U.S. National Stage Filing under 35 U.S.C. §371 of International Patent Application Serial No. PCT/SE2013/050428, filed Apr. 22, 2013, and entitled "Transmission of a Random Access Response Message."

TECHNICAL FIELD

Embodiments of the present invention presented herein generally relate to telecommunication. More particularly, this disclosure presents methods and radio network nodes for the transmission of a random access response message during a random access procedure.

BACKGROUND

Detailed descriptions of radio networks and systems can be found in literature, such as in Technical Specifications published by, e.g., the 3$^{rd}$ Generation Partnership Project (3GPP). In such systems, user equipments (UE) can, e.g., access mobile services via an access network comprising a Radio Access Network (RAN) and a Core Network (CN). Examples of 3GPP-based communication networks include, for example, 2G GSM/GPRS (Global System for Mobile Communications/General Packet Radio Services), 3G UMTS (Universal Mobile Telecommunications System), and LTE (Long Term Evolution) EPS (Evolved Packet System). Examples of radio access networks (RAN) include GERAN (GSM/EDGE (Enhanced Data rates for GSM Evolution) RAN for 2G GSM/GPRS), UTRAN (Universal Terrestrial RAN for 3G UMTS), and E-UTRAN (Evolved UTRAN for LTE EPS). Examples of packet core networks include GPRS Core (for 2G and 3G) and Evolved Packet Core (for 2G, 3G UTRAN and E-UTRAN).

A fundamental requirement for a radio network is the possibility for a UE to request a connection setup to the radio network. This is commonly referred to as random access. FIG. 1 illustrates an example random access procedure of a UE in a 3rd Generation Partnership Project (3GPP) Long Term Evolution (LTE) communication system. In LTE, random access is used for several purposes, including among other things:

- for initial access when establishing a radio link (moving from a RRC_IDLE state to a RRC_CONNECTED state; RRC is an abbreviation for Radio Resource Control);
- for re-establishing a radio link after radio link failure;
- for handover when uplink synchronization is to be established to a new radio cell;
- for establishing uplink (i.e. the direction from UE to radio network) synchronization if uplink (UL) or downlink (DL) data arrives when the UE is in the RRC_CONNECTED state and the UL is not synchronized;
- for the purpose of positioning using positioning methods based on UL measurements;
- as a scheduling request if no dedicated scheduling-request resources have been configured on the Physical Uplink Control Channel (PUCCH).

Acquisition of UL timing is an objective for all cases above. When establishing an initial radio link (i.e., when the UE is moving from RRC_IDLE to RRC_CONNECTED), the random access procedure generally also serves the purpose of assigning a unique identity, namely the Cell Radio Network Temporary Identifier (C-RNTI), to the UE. There are two types of random access schemes, a contention-based random access and a contention-free random access.

An example of contention-based random access procedure using a four-step procedure, illustrated in FIG. 1, comprises the following steps:

Step 101. The UE 10 transmits 101 a random access preamble (RA MSG1) to the radio network node 20, e.g., on the Physical Random Access Channel (PRACH).

Step 102. The radio network node 20 transmits 102 a random access response (RAR) RA MSG2 to the UE 10. With reference to FIG. 2, an example of a RAR message (i.e. RA MSG2 transmitted 102 from the radio network node 20 to the UE 10) is shown. A medium access control (MAC) protocol data unit (PDU) format as defined in the Technical Specification 3GPP TS 36.321 V.11.2.0 (see e.g. chapter 6.1.5 "MAC PDU (Random Access Response)") and as exemplified in FIG. 2 comprises a MAC header 230 and zero, one or more MAC RARs 240. The MAC RARs 240 are so-called payload fields. Optionally, a padding field 250 can be included. The MAC header 230 has a variable length and includes at least one MAC subheader 210, 220. Each subheader 220 except a Backoff (BI) indicator subheader 210 corresponds to one MAC RAR. If included, the BI subheader 210 may be the first subheader included within the MAC header 210. According the earlier-mentioned technical specification, i.e. 3GPP TS 36.321 V11.2.0 (see e.g. chapter 6.1.5 "MAC PDU (Random Access Response)"), and as exemplified in FIG. 3 a MAC RAR 240 generally comprises four fields 310-340. Each MAC RAR generally comprises six octets, each octet comprising eight bits. A first field 310 is a reserved (R) field of one bit. A second field 320 is a Timing Advance Command field of eleven bits. A third field 330 is an uplink (UL) grant field. The third field 330 is generally 20 bits. Finally, a fourth field 340 is a Temporary C-RNTI (Cell Radio Network Temporary Identifier) field. The fourth field 340 is generally 16 bits.

Step 103. When the UE 10 successfully receives a response message, RA MSG 2, from the radio network node 20 (i.e. in response to the random access preamble sent in RA MSG 1), the UE 10 transmits RA MSG3 including a UE identifier (ID) to the radio network node 20. When doing so, the UE 10 may use radio resources which have been allocated to the UE 10 by the radio network node 20, as is well-known among persons skilled in the art. The RA MSG 3 is sometimes referred to as a RRCConnectionRequest message.

Step 104. The radio network node 20 receiving the RA MSG 3 transmits 104 a RA MSG 4 to complete, or conclude, the contention resolution. This RA MSG4 is sometimes referred to as a RRCConnectionSetup message. Consequently, the UE 10 receives the contention resolution message RA MSG 4. The random access procedure is completed when the UE 10 receives the contention resolution message RA MSG 4.

It should be appreciated that contention-free random access is generally only used for re-establishing UL synchronization upon DL data arrival, handover and positioning. Only the first two steps, i.e. steps 101-102, of the procedure in FIG. 1 are used as there is generally no need for contention resolution in a contention-free random access. A more detailed description of the random access procedures in general can be found in literature, such as in the reference book *4G LTE/LTE-Advanced for Mobile Broadband* by Erik Dahlman, Stefan Parkvall and Johan Sköld, Academic Press, 2011, ISBN:978-0-12-385489-6, see e.g. chapter 14.3 "Random Access".

The number of UEs such as mobile telephones, cellular telephones, laptops, or tablet computers is increasing rapidly. At the same time, the number of Machine Type Communication (MTC) devices (see e.g. 3GPP TS 22.368 V.12.0.0) in radio networks is increasing rapidly too. MTC devices are a form of a UE which does not necessarily involve human interaction and may, e.g., include sensors, actuators, measurement devices, etc. A potential challenge when the number of UEs (including MTC devices) is increasing rapidly is that that more UEs may request radio network resources simultaneously. As a consequence, the demand from UEs for initiating random access procedures also increases. In turn, the risk for congestion or overload in radio networks increases.

SUMMARY

It is in view of the above considerations and others that the various embodiments of the present invention have been made.

It is therefore an aim to reduce the risk of congestion in radio networks. The various embodiments of the present invention as set forth in the appended independent claims address this general object. The appended dependent claims represent additional advantageous embodiments of the present invention.

According to an aspect, there is a method performed by a radio network node for compressing a Medium Access Control Random Access Response (MAC RAR) of at least two MAC RARs to be transmitted in a single random access response message (e.g. RA MSG2) to at least two User Equipments (UEs), wherein each of said at least two MAC RARs is aiming at a different one of said at least two UEs. The method comprises generating a first MAC RAR, and generating a successive MAC RAR by differentially coding one or more bits of a field of the successive MAC RAR to produce a compressed successive MAC RAR. The method may also comprise establishing a relation at a bit level between a field of the first MAC RAR and a corresponding field of the successive MAC RAR. Differentially coding one or more bits of said field of the successive MAC RAR to produce the compressed successive MAC RAR may thus comprise differentially coding the one or more bits with respect to the established relation. In some embodiments, the method may additionally comprise generating a n:th MAC RAR by differentially coding one or more bits of a field of the n:th MAC RAR to produce a compressed n:th MAC RAR. The method may further comprise establishing a relation at a bit level between a field of the n:th MAC RAR and a corresponding field of a preceding MAC RAR. Differentially coding one or more bits of said field of the n:th MAC RAR to produce the compressed n:th MAC RAR may thus comprise differentially coding the one or more bits with respect to the established relation.

In some embodiments, the above mentioned fields may be Temporary Cell Radio Network Temporary Identifier, TC-RNTI, fields. The method may for example comprise allocating a first TC-RNTI value ($X_{TC\text{-}RNTI1}$) to a first UE, allocating a second TC-RNTI value ($X_{TC\text{-}RNTI2}$) to a second UE, and establishing a differential relation between the first TC-RNTI value ($X_{TC\text{-}RNTI1}$) and the second TC-RNTI value ($X_{TC\text{-}RNTI2}$) to be the difference ($X_{TC\text{-}RNTI2}-X_{TC\text{-}RNTI1}$) between the second TC-RNTI value ($X_{TC\text{-}RNTI2}$) and the first TC-RNTI value ($X_{TC\text{-}RNTI1}$). The differentially coding of one or more bits of said field of the successive MAC RAR to produce the compressed successive MAC RAR may comprise differentially coding the one or more bits with respect to the established differential relation between the first TC-RNTI value ($X_{TC\text{-}RNTI1}$) and the second TC-RNTI value ($X_{TC\text{-}RNTI2}$). Furthermore, the method may additionally comprise allocating a n:th TC-RNTI value ($X_{TC\text{-}RNTI(n)}$) to a n:th UE, and establishing a differential relation between a TC-RNTI value ($X_{TC\text{-}RNTI(n-1)}$) and the n:th TC-RNTI value ($X_{TC\text{-}RNTI(n)}$) to be the difference ($X_{TC\text{-}RNTI(n)}-X_{TC\text{-}RNTI(n-1)}$) between the n:th TC-RNTI value, ($X_{TC\text{-}RNTI(n)}$) and a preceding TC-RNTI value ($X_{TC\text{-}RNTI(n-1)}$). Also, differentially coding one or more bits of said field of a n:th MAC RAR to produce a compressed n:th MAC RAR may comprise differentially coding the one or more bits of said field with respect to the established differential relation between the n:thTC-RNTI value ($X_{TC\text{-}RNTI(n)}$) and the preceding TC-RNTI value ($X_{TC\text{-}RNTI(n-1)}$). In one embodiment, the method additionally comprises allocating said TC-RNTI values in a sequential order. For example, the method may comprise allocating said TC-RNTI values in a sequential order by incrementing each successive TC-RNTI value by a value of one.

In alternative embodiments, the earlier-mentioned fields are Uplink (UL) Grant fields. The method may for example comprise allocating a first resource block start position ($RB_1$) to a first UE, allocating a second resource block start position ($RB_2$) to a second UE, and establishing a differential relation between the first resource block start position ($RB_1$) and the second resource block start position ($RB_2$) to be the difference ($RB_2-RB_1$) between the second resource block start position ($RB_2$) and the first resource block start position ($RB_1$). The differentially coding of one or more bits of said field of the successive MAC RAR to produce the compressed successive MAC RAR may thus comprise differentially coding the one or more bits of said field with respect to the established differential relation between the first resource block start position ($RB_1$) and the second resource block start position ($RB_2$). The method may additionally comprise allocating a n:th resource block start position ($RB_{(n)}$) to a n:th UE, and establishing a differential relation between a preceding resource block start position ($RB_{(n-1)}$) and the n:th resource block start position ($RB_{(n)}$) to be the difference ($RB_{(n)}-RB_{(n-1)}$) between the n:th resource block start position (RB) and the preceding resource block start position ($RB_{(n-1)}$), wherein differentially coding one or more bits of said field of the n:th MAC RAR to produce the compressed n:th MAC RAR comprises differentially coding the one or more bits of said field with respect to the established differential relation between n:th resource block start position ($RB_{(n)}$) and preceding resource block start position ($RB_{(n-1)}$). In one embodiment, the method may advantageously, though not necessarily, also comprise allocating the same amount of RBs to the at least two UEs. For example, the method may comprise allocating the same amount of RBs to all UEs. In one embodiment, the method may additionally comprise allocating said resource block positions in a sequential order. For example, the method may comprise allocating said resource block positions in a sequential order by incrementing each successive resource block position by a value of one.

The methods described hereinabove may also comprise transmitting, to several UEs, a single random access message comprising the first MAC RAR, the successive MAC RAR and optionally a n:th MAC RAR. The transmitted MAC RARs are targeting different UEs.

According to another aspect, there is provided a radio network node for compressing a MAC RAR of at least two MAC RARs to be transmitted in a single random access response message (e.g. RA MSG2) to at least two UEs, wherein each of said at least two MAC RARs is aiming at a different one of said at least two UEs. The radio network node, which may be implemented as an evolved eNodeB, comprises: a processor and a memory. The memory stores computer program code which, when run in the processor, causes the radio network node to: generate a first MAC RAR, and generate a successive MAC RAR by differentially coding one or more bits of a field of the successive MAC RAR to produce a compressed successive MAC RAR.

In one embodiment, the memory may store computer program code which, when run in the processor, causes the radio network node to establish a relation at a bit level between a field of the first MAC RAR and a corresponding field of the successive MAC RAR, and furthermore causes the radio network node to differentially code the one or more bits with respect to the established relation.

The radio network node may also comprise a transmitter configured to transmit, e.g. to several UEs, a single random access message comprising the first MAC RAR, the successive MAC RAR and optionally a n:th MAC RAR.

As will be appreciated and according to some aspects, it is proposed to generate a first MAC RAR, and generate a successive MAC RAR by differentially coding one or more bits of a field of the successive MAC RAR to produce a compressed successive MAC RAR. Advantageously, a relation at a bit level is also established between a field of the first MAC RAR and a corresponding field of the successive MAC RAR. Thus, the differentially coding of one or more bits of said field of the successive MAC RAR to produce the compressed successive MAC RAR may comprise differentially coding the one or more bits with respect to the established relation. Differentially coding one or more bits of a field of the successive MAC RAR to produce a compressed successive MAC RAR enables a successive MAC RAR to occupy fewer bits. If many successive MAC RARs occupy fewer bits it is made possible to include, or introduce, more MAC RARs (each targeting a different UE) in a single, i.e. one and the same, random access response message (e.g. RA MSG2). Thus, since each MAC RAR is aiming at, or targeting, a different one of the several UEs, a single random access response message can be transmitted to many UEs at the same time. Since more UEs can be targeted by a single random access response message, less random access response messages need to be sent for a certain number of UEs. Thus, the capacity is enhanced in that one and the same random access message is capable of aiming at, or targeting, more UEs. Consequently, the radio network can support more UE (and, thus, users) per radio cell. Moreover, this may allow for reducing the risk for congestion when the number of UEs increases.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

Figure 1:
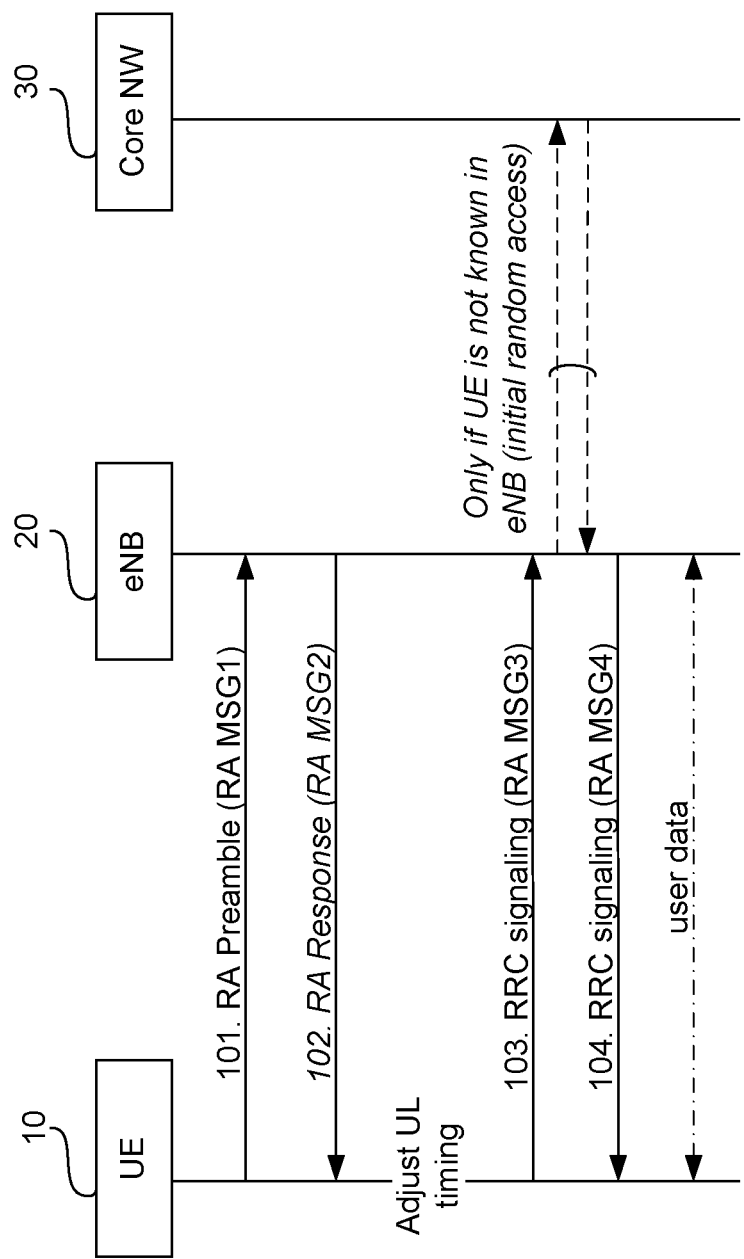
FIG. 1 illustrates an example random access procedure.

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), relay node, access point, etcetera.

A method performed by a radio network node as well as a radio network node are proposed herein. The radio network node is configured to transmit, i.e. send, a random access response message (e.g. RA MSG2, see FIG. 1) to several UEs. A random access response message may be a single RA MSG2 comprising multiple MAC RARs (e.g. MAC RAR 1, MAC RAR 2, . . . , MAC RAR n; see FIG. 2), wherein each MAC RAR is targeting, or aiming at, a different one of a plurality of UEs. According to the various embodiments described in this disclosure, it is proposed to generate a first MAC RAR, and generating a successive MAC RAR by differentially coding one or more bits of a field of the successive MAC RAR to produce a compressed successive MAC RAR. If a larger number of UEs are to be targeted, e.g. n number of UEs, the method may comprise generating a n:th MAC RAR by differentially coding one or more bits of a field of the n:th MAC RAR to produce a compressed n:th MAC RAR. Advantageously, a relation at a bit level between a field of the first MAC RAR and a corresponding field of the successive MAC RAR is also established. Then, differentially coding of the one or more bits of said field of the successive MAC RAR to produce the compressed successive MAC RAR may comprise differentially coding the one or more bits with respect to the established relation. Correspondingly, the method may further comprise establishing a relation at a bit level between a field of the n:th MAC RAR and a corresponding field of a preceding MAC RAR. Differentially coding one or more bits of said field of the n:th MAC RAR to produce the compressed n:th MAC RAR may thus comprise differentially coding the one or more bits with respect to the established relation. In other words, the number of MAC RARs may correspond to the number of UEs that are to be targeted by the random access response message. Differentially coding one or more bits of a field of the successive MAC RAR to produce a compressed successive MAC RAR enables a successive MAC RAR to occupy fewer bits. If many successive MAC RARs occupy fewer bits it is made possible to include, or introduce, more MAC RARs in a single random access response message. Thus, since each MAC RAR is targeting a different one of the several UEs, a single random access response can be transmitted to many UEs at the same time. Since more UEs can be targeted by a single random access response message, less random access response messages will have to be sent for a certain number of UEs. Thus, the capacity in the radio network is enhanced in that one and the same random access message is capable of aiming at, or targeting, more UEs. In turn, this may allow for reducing the risk of congestion when there are a lot of UEs requesting random access simultaneously.

Figure 2:
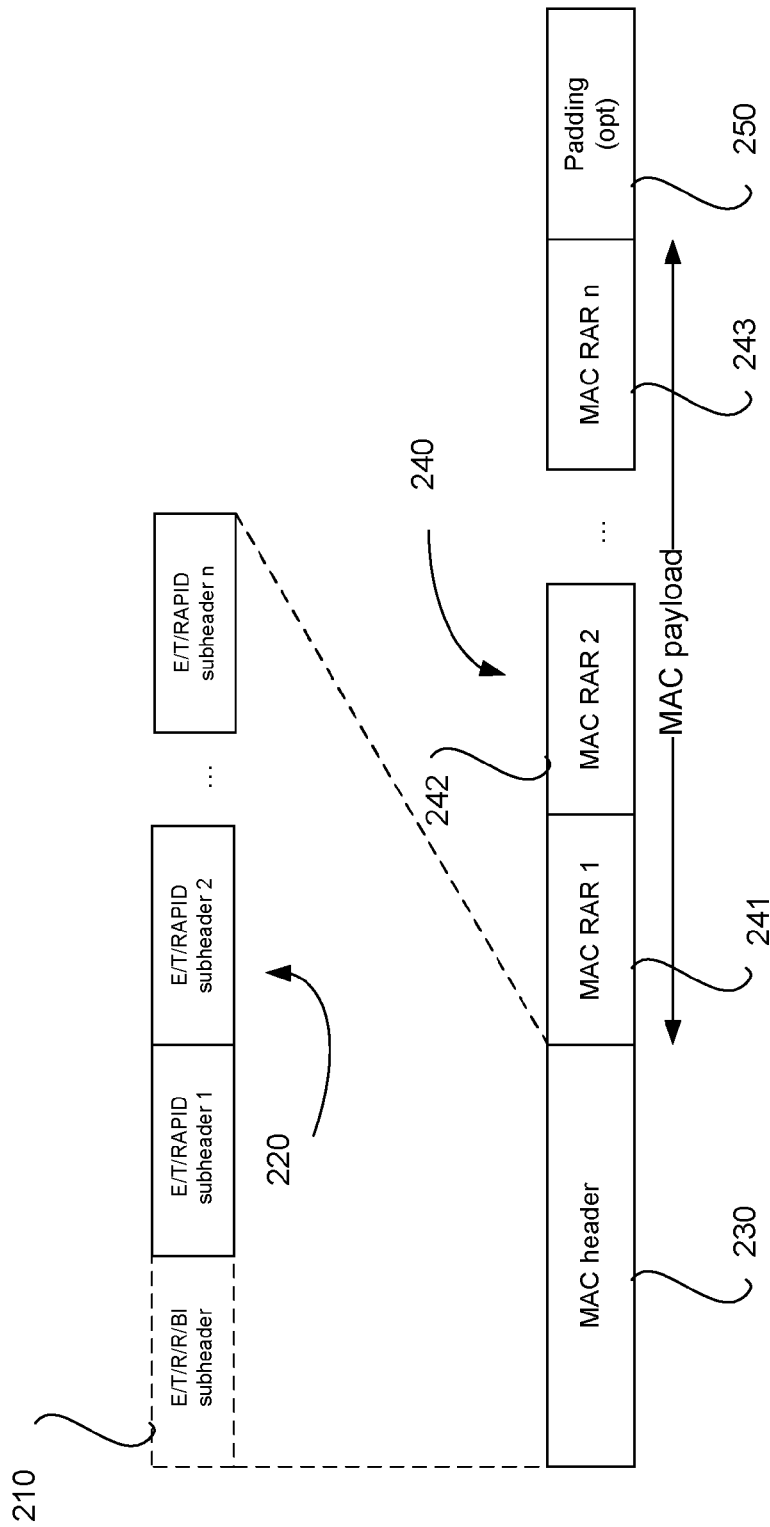
FIG. 2 shows an example constitution, or format, of a MAC PDU.
Figure 4:
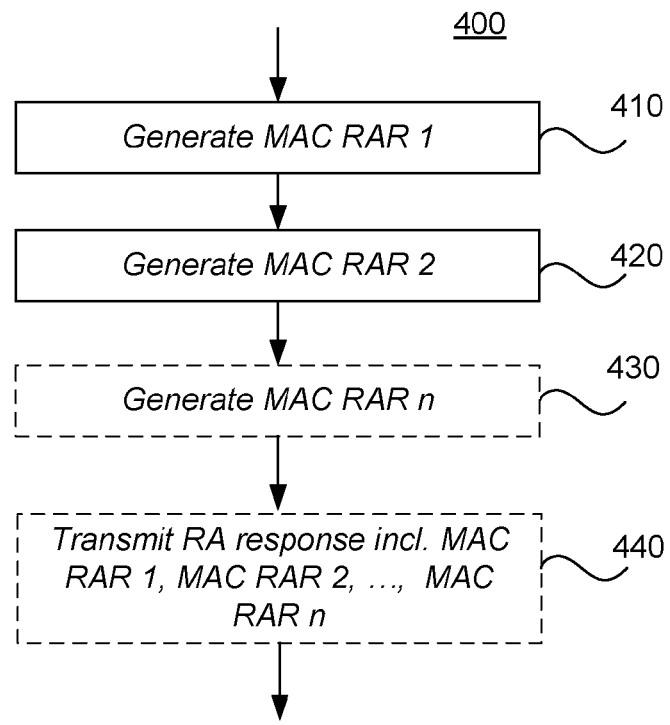
FIG. 4 is a flow chart of an example method according to an embodiment of the invention.

In the following, various embodiments of the invention will be described in more detail. With reference to FIG. 4, an example method 400 according to an embodiment of the invention is illustrated. The method 400 is performed by, or implemented in, a radio network node. The radio network node may, for example, be embodied as an evolved NodeB (eNB). The radio network node is configured for transmission of a random access response message (i.e. RA MSG2) as illustrated in FIG. 1. Accordingly, the radio network node is configured to transmit a random access response message to one or several UEs, e.g. one or several UEs from which the radio network node has previously received a RA MSG1 message (see FIG. 1). If more than one UE is to be targeted by the random access response message, the random access response message may include several MAC RARs each aiming at, or targeting, a different one of the multiple UEs. The method 400 is applicable when at least two, i.e. two or more, UEs are to be targeted by the same random access message, which is to be transmitted by the radio network node to the at least two UEs.

Figure 3:
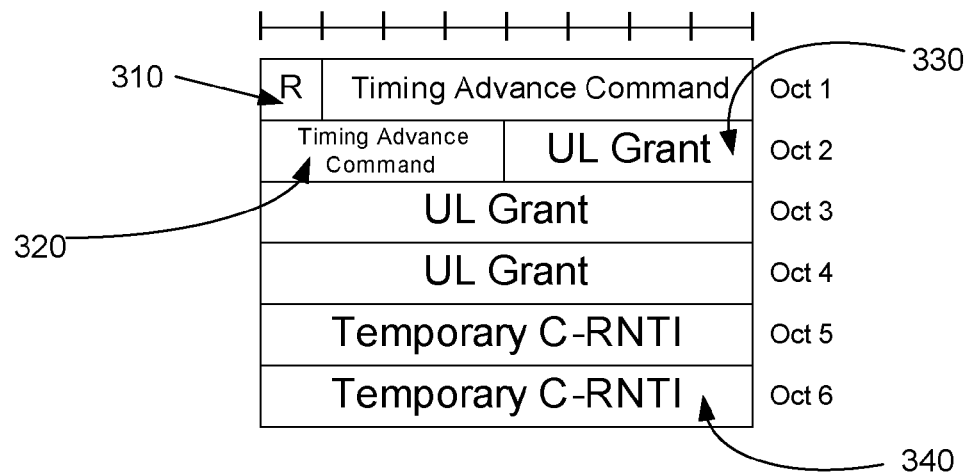
FIG. 3 shows an example constitution, or format, of a MAC RAR shown in FIG. 2.

A first MAC RAR1 is generated 410. Also, a successive MAC RAR2 is generated 420. In contrast to the existing art where both the first MAC RAR1 and the successive MAC RAR2 would have had the same constitution, or format, as illustrated in FIG. 3, the successive MAC RAR2 according to this example will take a different constitution, or format. This is because the successive MAC RAR2 is generated 420 by differentially coding one or more bits of a field of the successive MAC RAR2 to produce a compressed successive MAC RAR2. Depending on how many UEs that are to be targeted in one and the same random access response message, the method may comprise generating 430 up to a number of n MAC RARs (i.e., MAC RAR1, MAC RAR2, . . . , MAC RARn) by differentially coding one or more bits of a field of the n number of MAC RAR s to produce n−1 number of compressed MAC RARs.

In an advantageous embodiment, a relation at a bit level between a field of the first MAC RAR1 and a corresponding field of the successive MAC RAR2 is also established. Then, differentially coding of the one or more bits of said field of the successive MAC RAR2 to produce the compressed successive MAC RAR2 may comprise differentially coding the one or more bits with respect to the established relation. Correspondingly, the method may further comprise establishing a relation at a bit level between a field of a n:th MAC RARn and a corresponding field of a preceding MAC RARn−1. Differentially coding one or more bits of said field of the n:th MAC RARn to produce the compressed n:th MAC RARn may thus comprise differentially coding the one or more bits with respect to the established relation. The relation between the fields of two successive MAC RARs may, e.g., be established in a deterministic manner. Different examples of establishing the relation at a bit level between fields of successive MAC RARs will be further described below with respect to FIGS. 5 and 7, respectively.

Furthermore, the radio network node may transmit 440 the random access message comprising the first MAC RAR1 and the successive MAC RARs (e.g. MAC RAR2, MAC RAR3, . . . , MAC RARn) to several UEs.

EXAMPLE 1: Differentially Coding of TC-RNTI Fields

Figure 5:
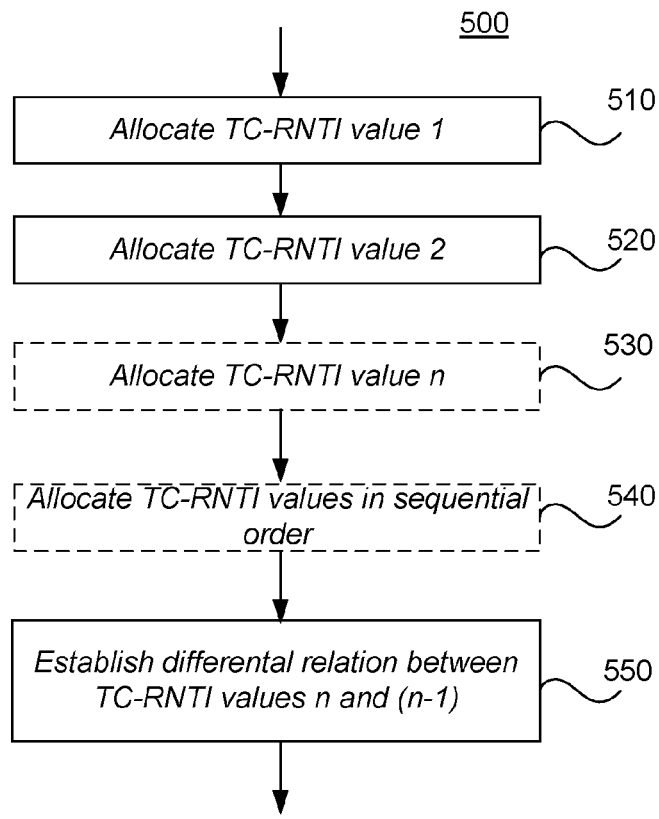
FIG. 5 is a flow chart of an example method according to an embodiment of the invention.

In one example embodiment, the above-mentioned fields may be the Temporary Cell Radio Network Temporary Identifier (TC-RNTI) fields of the MAC RAR (see FIG. 3). In this example, the radio network node initially allocates TC-RNTI values to the multiple UEs (to be targeted by the random access response message). With reference to FIG. 5, a first TC-RNTI value ($X_{TC-RNTI1}$) is allocated 510 to a first UE, and a second TC-RNTI value ($X_{TC-RNTI2}$) is allocated 520 to a second UE. Also, assume that a third TC-RNTI value ($X_{TC-RNTI3}$) is allocated 530 to a third UE. According to this example, a differential relation is established 550 between the first TC-RNTI value ($X_{TC-RNTI1}$) and the second TC-RNTI value ($X_{TC-RNTI2}$). The differential relation is defined to be the difference ($X_{TC-RNTI2}-X_{TC-RNTI1}$) between the second TC-RNTI value ($X_{TC-RNTI2}$) and the first TC-RNTI value ($X_{TC-RNTI1}$). Similarly, a differential relation is established 550 between the second TC-RNTI value ($X_{TC-RNTI2}$) and the third TC-RNTI value ($X_{TC-RNTI3}$). Again, the differential relation is defined to be the difference ($X_{TC-RNTI3}-X_{TC-RNTI2}$) between two successive TC-RNTI values, i.e. the third TC-RNTI value ($X_{TC-RNTI3}$) and the second TC-RNTI value ($X_{TC-RNTI2}$) in this particular example.

Figure 6:
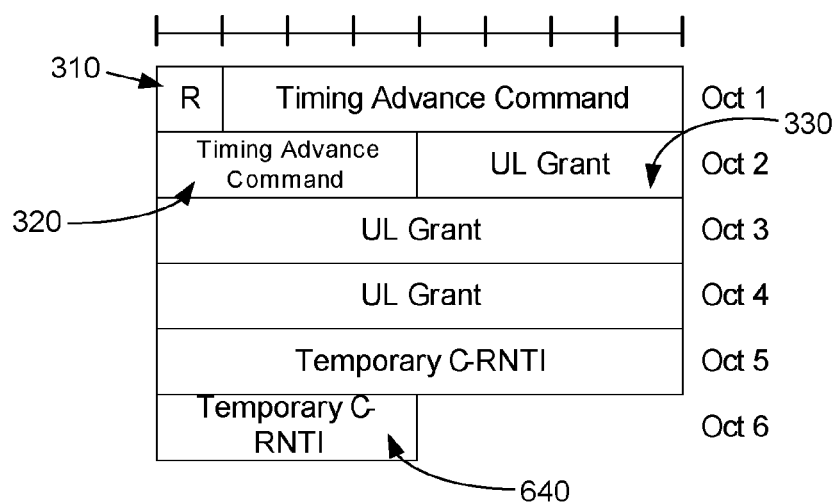
FIG. 6 shows an example constitution, or format, of a MAC RAR.

Assume, for example, that the radio network node wants to allocate, or assign, three TC-RNTI values and their respective values are 10, 100, and 250, respectively. That is $X_{TC-RNTI1}=10$, $X_{TC-RNTI2}=100$, and $X_{TC-RNTI3}=250$. It is thus also assumed that $X_{TC-RNTI1}<X_{TC-RNTI2}<X_{TC-RNTI3}$. The earlier-mentioned differential relation between the first TC-RNTI value ($X_{TC-RNTI1}$) and the second TC-RNTI value ($X_{TC-RNTI2}$) can be established, or defined, to be the difference between the second TC-RNTI value ($X_{TC-RNTI2}$) and the first TC-RNTI value ($X_{TC-RNTI1}$), i.e. $\Delta_{TC-RNTI2}=X_{TC-RNTI2}-X_{TC-RNTI1}$. Similarly, the differential relation between the second TC-RNTI value ($X_{TC-RNTI2}$) and the third TC-RNTI value ($X_{TC-RNTI3}$) can be established to be the difference between the third TC-RNTI value ($X_{TC-RNTI3}$) and the second TC-RNTI value ($X_{TC-RNTI2}$), i.e. $\Delta_{TC-RNTI3}=X_{TC-RNTI3}-X_{TC-RNTI2}$. In this example, $\Delta_{TC-RNTI2}=X_{TC-RNTI2}-X_{TC-RNTI1}=100-10=90$ and $\Delta_{TC-RNTI3}=X_{TC-RNTI3}-X_{TC-RNTI2}=250-100=150$. As will be appreciated, the differential relation $\Delta_{TC-RNTI}$ can be seen as an offset value between two successive (allocated) TC-RNTI values. The differentially coding of one or more bits of the TC-RNTI field of the second MAC RAR2 to produce the compressed second MAC RAR2 may then comprise differentially coding the one or more bits with respect to the established differential relation between the first TC-RNTI value ($X_{TC-RNTI1}$) and the second TC-RNTI value ($X_{TC-RNTI2}$). That is, the TC-RNTI field of the second MAC RAR2 may be coded as $\Delta_{TC-RNTI2}=90$ (instead of 100) using twelve bits as 000001011010. In a similar manner, the differentially coding of one or more bits of the TC-RNTI field of the third MAC RAR3 to produce the compressed third MAC RAR3 may then comprise differentially coding the one or more bits with respect to the established differential relation between the second TC-RNTI value ($X_{TC-RNTI2}$) and the third TC-RNTI value ($X_{TC-RNTI3}$). That is, the TC-RNTI field of MAC RAR3 may be coded as $\Delta_{TC-RNTI3}=150$ (instead of 250) using twelve bits as 000010010110. According to this example, the TC-RNTI field of the first MAC RAR1 may be coded as 10 using the normal, or regular, 16 bits (see FIG. 3) whereas successive MAC RARs (i.e. MAC RAR2 and MAC RAR3 in this example) use only twelve bits. By using the established differential relation for differential coding one or more bits of TC-RNTI fields of successive MAC RARs it is made possible to occupy fewer bits in a single, i.e. one and the same, random access response message if multiple MAC RARs are to be included in the random access response message. If successive MAC RARs are allowed to occupy fewer bits (12 bits compared with the normal 16 bits), a MAC RAR may take the format, or constitution, as illustrated in FIG. 6. As can be seen, less bits are used as compared to the normal MAC RAR constitution illustrated in FIG. 3.

Optionally, the radio network node may be configured to allocate 540 TC-RNTI values in sequential order, e.g. from low to high. The less difference, i.e. $\Delta_{TC-RNTI}$, there is between two successive TC-RNTI values, the less bits may be needed to produce the compressed MAC RAR. Therefore, if allocating TC-RNTI values in sequential order, it may be advantageous to allocate the TC-RNTI values in the sequential order by incrementing each successive TC-RNTI value by a value of one. This way, the difference, i.e. $\Delta_{TC-RNTI}$, will be one. Assume, for instance, that the radio network node wants to allocate, or assign, three TC-RNTI values and their respective values are 150, 151, and 152, respectively. That is $X_{TC-RNTI1}=150$, $X_{TC-RNTI2}=151$, and $X_{TC-RNTI3}=152$. Then, $\Delta_{TC-RNTI2}=X_{TC-RNTI2}-X_{TC-RNTI1}=151-150=1$ and $\Delta_{TC-RNTI3}=X_{TC-RNTI3}-X_{TC-RNTI2}=152-151=1$. This may allow for occupying even fewer bits for the TC-RNTI fields of successive MAC RARs.

EXAMPLE 2: Differentially Coding of UL Grant Fields

In one example embodiment, the earlier-mentioned fields may be the UL Grant fields of the MAC RAR (see FIG. 3). As specified in 3GPP TS 36.213 V.11.2.0 (see chapter 6.2 "Random Access Response Grant"), an UL Grant field generally comprises the following content (20 bits):
  Hopping flag—1 bit
  Fixed size resource block assignment—10 bits
  Truncated modulation and coding scheme—4 bits
  TPC command for scheduled PUSCH—3 bits
  UL delay—1 bit
  CSI request—1 bit
For resource assignment, the fixed size resource block assignment is generally used. A certain number of resource blocks (RBs) and a RB start position is generally assigned to each UE as detailed in 3GPP TS 36.213 V.11.2.0 (see e.g. chapter 8.1 "Resource Allocation for PDCCH/EPDCCH with uplink DCI Format") In this example, the radio network node initially allocates RB start positions to the multiple UEs (to be targeted by the random access response message). Also, in this example embodiment it is generally assumed that the radio network node initially allocates a same amount, i.e. a same number, of resource blocks (RBs) to the plurality of UEs (e.g. all UEs) to be targeted by the random access response message.

Figure 7:
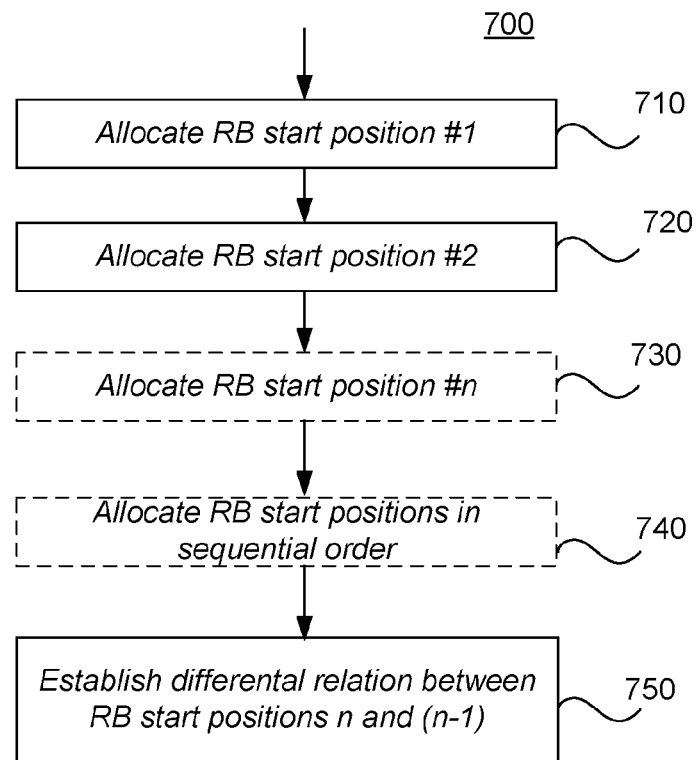
FIG. 7 is a flow chart of an example method according to an embodiment of the invention.

With reference to FIG. 7, a first RB start position ($RB_1$) is allocated 710 to a first UE, and a second RB start position ($RB_2$) is allocated 720 to a second UE. Also, assume that a third RB start position ($RB_3$) is allocated 730 to a third UE. According to this example, a differential relation is established 750 between the first RB start position ($RB_1$) and the second RB start position ($RB_2$). The differential relation is defined to be the difference ($RB_2-RB_1$) between the second RB start position ($RB_2$) and the first RB start position ($RB_1$). Similarly, a differential relation is established 750 between the second RB start position ($RB_2$) and the third RB start position ($RB_3$). Again, the differential relation is defined to be the difference ($RB_3-RB_2$) between two successive RB start positions, i.e. the third RB start position ($RB_3$) and the second RB start position ($RB_2$) in this example.

Figure 8:
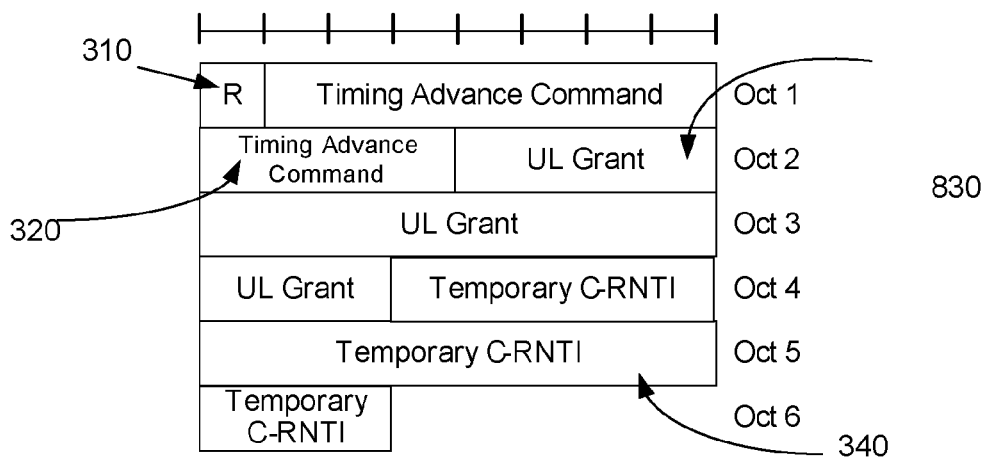
FIG. 8 shows an example constitution, or format, of a MAC RAR.

Assume, for example, that the radio network node wants to allocate, or assign, three RB start positions and their respective values are 2, 16, and 33, respectively. That is $RB_1=2$, $RB_2=16$, and $RB_3=33$. It is thus also assumed that $RB_1<RB_2<RB_3$. The above-mentioned differential relation between the first RB start position ($RB_1$) and the second RB start position ($RB_2$) can be established, or defined, to be the difference between the second RB start position ($RB_2$) and the first RB start position ($RB_1$), i.e. $\Delta_{RB2}=RB_2-RB_1$. Similarly, the differential relation between the second RB start position ($RB_2$) and the third RB start position ($RB_3$) can be established, or defined, to be the difference between the third RB start position ($RB_3$) and the second RB start position ($RB_2$), i.e. $\Delta_{RB3}=RB_3-RB_2$. In this example, $\Delta_{RB2}=RB_2-RB_1=16-2=14$ and $\Delta_{RB3}=RB_3-RB_2=33-16=17$. As will be appreciated, the differential relation $\Delta_{RB}$ can be seen as an offset value between two successive (allocated) RB start position values. The differentially coding of one or more bits of the UL Grant field of the second MAC RAR2 to produce the compressed second MAC RAR2 may then comprise differentially coding the one or more bits with respect to the established differential relation between the first RB start position value ($RB_1$) and the second RB start position value ($RB_2$). That is, the UL Grant field (or rather, the RB start position of the Fixed size resource block assignment of the UL Grant field) of the second MAC RAR2 is coded as $\Delta_{RB2}=14$ (instead of 16) using five bits as 01110. In a similar manner, the differentially coding of one or more bits of the UL Grant field of the third MAC RAR3 to produce the compressed third MAC RAR3 may then comprise differentially coding the one or more bits with respect to the established differential relation between the second RB start position ($RB_2$) and the third RB start position ($RB_3$). That is, the UL Grant field of MAC RAR3 can be coded with respect to the RB start position as $\Delta_{RB3}=17$ (instead of 33) using five bits as 10001. Consequently, in this example the UL Grant field of the first MAC RAR1 may be coded as 2 with respect to the RB start position using the normal, or regular, 10 bits of the Fixed size resource block assignment of the UL Grant field whereas successive MAC RARs (i.e. MAC RAR2 and MAC RAR3 in this example) use only five bits. By using the established differential relation for differential coding of one or more bits of UL Grant fields of successive MAC RARs it is made possible to occupy fewer bits in a single, i.e. one and the same, random access response message if multiple MAC RARs are to be included in the random access response message. If successive MAC RARs are allowed to occupy fewer bits (5 bits compared with the normal 10 bits), a MAC RAR may take the format, or constitution, as illustrated in FIG. 8. As can be seen, lees bits are used as compared to the normal MAC RAR constitution illustrated in FIG. 3.

Optionally, the radio network node may be configured to allocate 740 RB start position values in sequential order, e.g. from low to high. The less difference, i.e. $\Delta_{RB}$, there is between two successive RB start position values, the less bits may be needed to produce the compressed MAC RAR. Therefore, if allocating RB start position values in sequential order, it may be advantageous to allocate these RB start position values in the sequential order by incrementing each successive RB start position value by a value of one. This way, the difference, i.e. $\Delta_{RB}$, will be one. This may allow for occupying even fewer bits for the UL Grant fields of successive MAC RARs.

Figure 9:
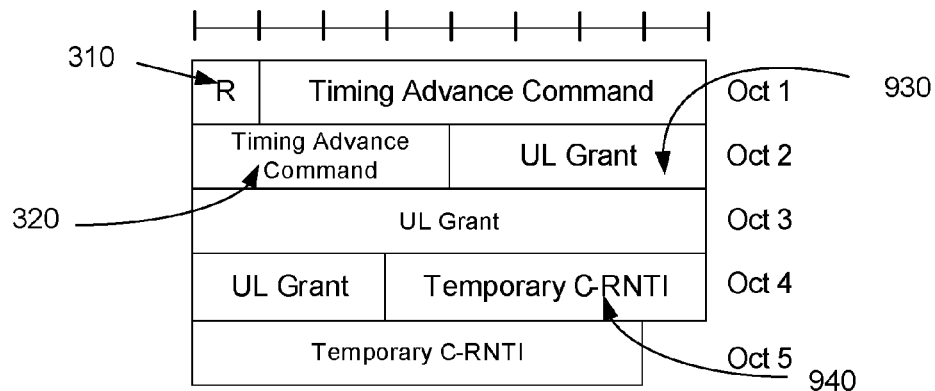
FIG. 9 shows an example constitution, or format, of a MAC RAR.

It will be appreciated that the above-described examples, i.e. example 1 and example 2, can be combined. In other words, it is possible to differentially code one or more bits of corresponding TC-RNTI fields of successive MAC RARs and simultaneously differentially code one or more bits of corresponding UL Grant fields of successive MAC RARs. This way, it is made possible to occupy even fewer bits. FIG. 9 shows one example constitution of a compressed MAC RAR where the UL Grant field comprises a Fixed size resource block assignment (occupying 5 bits, instead of 10 bits) and a TC-RNTI field (occupying 12 bits, instead of 16 bits). As can be seen, the MAC RAR illustrated in FIG. 9 occupies nine bits less than the regular, or normal, MAC RAR as illustrated in FIG. 3. In total, nine bits are saved. A regular MAC RAR (see FIG. 3) occupies 48 bits and consequently the by the MAC RAR in FIG. 9 is 9/48≈19%.

Figure 10:
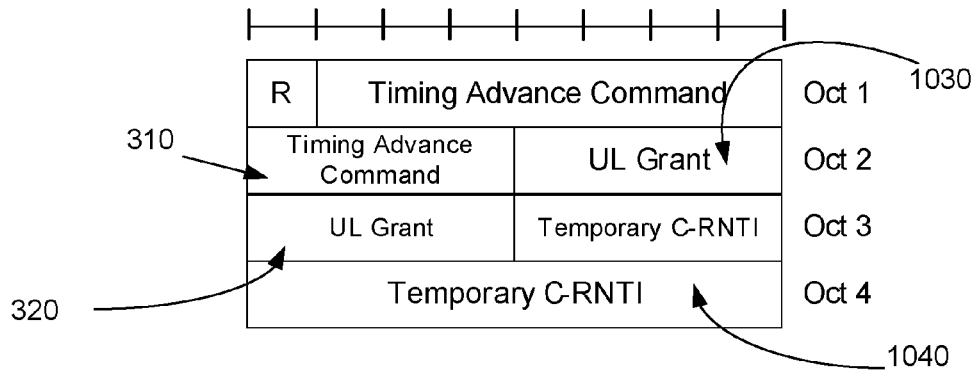
FIG. 10 shows an example constitution, or format, of a MAC RAR.

However, it may be advantageous to allow for a MAC RAR with byte alignment in such a way that the MAC RAR comprises an integral number of octets, i.e. an integral number of bytes. The integral number of octets may advantageously be an even number, such as four octets. Among other things, a MAC RAR with byte alignment may allow for reducing the complexity for the UE to decode the compressed MAC RAR. Generally, there may be little motivation to compress the TPC command field of 3 bits of the UL Grant field. This may e.g. be because different UEs are generally located at different places and their respective required transmission power are therefore different. However, it could be conceivable to set the remaining fields of the UL Grant field (i.e. hopping flag, truncated modulation and coding scheme, UL delay, CSI request) to the same value for different UEs. If these fields are given, or allocated, the same values for different UEs, it may not be necessary to indicate these fields at all in the MAC RARs and the MAC RAR take a constitution which occupies even fewer bits. FIG. 10 illustrates such an example constitution of a MAC RAR comprising an UL Grant Field (having a TPC command field of 3 bits and a Fixed size resource block assignment of 5 bits) and a TC-RNTI field of 12 bits. The total saving compared to the normal MAC RAR constitution (see FIG. 3) is two octets, i.e. two bytes. In other words, the total saving by compressing a MAC RAR in this way is approximately 2/6≈33%.

If it is allowed to produce a compressed MAC RAR without byte alignment, it is possible to compress a MAC RAR even further. In one example embodiment, it is possible to allocate TC-RNTI values in sequential order by incrementing successive TC-RNTI values by the value of one and, at the same time, allocate RB start position values in sequential order by incrementing successive RB start position values by the value of one. It is believed that this could potentially lead to a saving of utilized bits in the range of 50-70% compared with a regular MAC RAR constitution (see FIG. 3).

As will be appreciated from the above, differentially coding one or more bits of a field (e.g. TC-RNTI filed and/or UL Grant field) of a successive MAC RAR according to the above examples in order to produce a compressed successive MAC RAR enables successive MAC RAR(s) to occupy fewer bits. If many successive MAC RARs occupy fewer bits it is made possible to include, or introduce, more MAC RARs (each targeting a different UE) in a single, i.e. one and the same, random access response message (e.g. RA MSG2). Thus, since each MAC RAR is aiming at, or targets, a different one of the several UEs, a single random access response can be transmitted to many UEs at the same time. Since more UEs can be targeted by a single random access response message, less random access response messages will have to be sent for a certain number of UEs. Thus, the radio network capacity can be enhanced in that one and the same random access message is capable of aiming at, or targeting, more UEs. In turn, this may allow for reducing the risk of congestion when many UEs are requesting initiation of random access procedures simultaneously.

Figure 11:
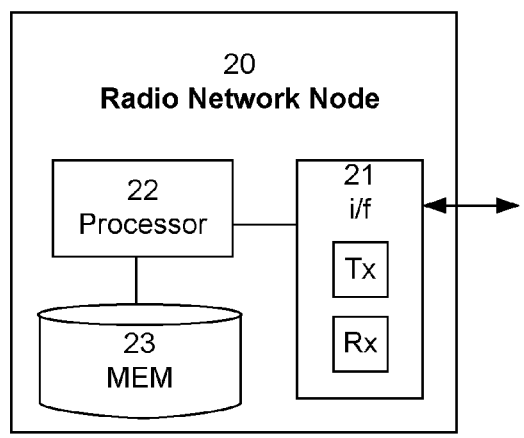
FIG. 11 shows an example embodiment of a radio network node.

Turning now to FIG. 11, an example embodiment of a radio network node 20 will be detailed. The radio network node 20 may be embodied as an eNB. The radio network node 20 is suitable for compressing a MAC RAR according to herein described methods. The radio network node 20 is configured to transmit a random access response message (e.g. a RA MSG2) comprising two or more MAC RARs. The radio network node 20 is configured to transmit the random access response message to several, i.e. more than one, UEs. Moreover, each one of the two or more MAC RARs can aim at, or target, a different one of the several UEs. In the illustrated embodiment, the radio network node 20 comprises a communication interface 21, a processor 22 and a memory 23. In this example embodiment, the communication interface 21 comprises a receiver and a transmitter. In alternative embodiments, the receiver and transmitter functionalities are combined into one single unit, a transceiver. Furthermore, the memory 23 stores computer program code which, when run in the processor 22, causes the radio network node 20 to implement herein described methods. Accordingly, the memory 23 stores computer program code which, when run in the processor 22, causes the radio network node 20 to generate a first MAC RAR, and also generate a successive MAC RAR by differentially coding one or more bits of a field of the successive MAC RAR to produce a compressed successive MAC RAR. The memory 23 may also store computer program code which, when run in the processor 22, causes the radio network node 20 to generate a n:th MAC RAR by differentially coding one or more bits of a field of the n:th MAC RAR to produce a compressed n:th MAC RAR. In one embodiment, the memory 23 stores computer program code which, when run in the processor 22, causes the radio network node 20 to establish a relation at a bit level between a field of the first MAC RAR and a corresponding field of the successive MAC RAR, and furthermore causes the radio network node 20 to differentially code the one or more bits with respect to the established relation. Also, the memory 23 may store computer program code which, when run in the processor 22, causes the radio network node 20 to establish a relation at a bit level between a field of the n:th MAC RAR and a corresponding field of a preceding MAC RAR, and furthermore causing the radio network node 20 to differentially code one or more bits of said field of the n:th MAC RAR to produce the compressed n:th MAC RAR with respect to the established relation. As will be appreciated, the transmitter 21 may be configured to transmit, to several UEs, a random access message comprising the first MAC RAR, the successive MAC RAR and optionally additional MAC RAR(s).

In some embodiments, the above-mentioned fields are TC-RNTI fields. In other alternatives, the above-mentioned fields are UL Grant fields. The memory 23 may thus store computer program code which, when run in the processor 22, causes the radio network node 20 to implement herein disclosed methods with respect to the earlier-described examples 1 and 2.

It should be appreciated that the radio network node 20 may provide for at least the same effects and advantages as described with respect to the methods disclosed herein.

As will also be appreciated from the above description, the radio network node 20 is configured to transmit a random access response message including at least two MAC RARs, at least one of which is a compressed MAC RAR. Several UEs 10 (see FIG. 1) may receive such a random access response message. The methods implemented by such UEs as well as the UEs themselves are outside the scope of this disclosure and will therefore not be described in detail herein. However, it goes without saying that an UE is generally configured to receive a random access response message from the radio network node 20. It should be appreciated by those skilled in the art that the UE should preferably have the capability to interpret, or decode, a compressed MAC RAR. That is, the UE should be capable of decoding a received random access response message, which includes one or more compressed MAC RARs, such as those compressed MAC RARs described throughout this disclosure. In other words, when a radio network node described herein is utilized for compressing MAC RAR(s), a UE receiving such compressed MAC RAR(s) should have the capability of interpret or otherwise recognizing, i.e. decoding, the received compressed MAC RAR(s). It is, for example, conceivable to use a pre-defined solution, e.g. where the UE may know in advance how many bits are used to compress the TC-RNTI field and/or the UE may know in advance how many bits are used to compress UL grant field are known in advance by UE. In order for the UE to know this in advance, this information could e.g. be defined, or hard-coded, in the UE in advance. Alternatively, the information could be signaled, e.g. broadcasted, by the radio network node to the UEs using system information (SI) messages. For example, the radio network node may signal this information using an existing SI message or, alternatively, using a newly defined SI message. Yet further, it is conceivable that some UEs are configured to interpret, or decode, a compressed MAC RAR(s) whereas other UEs have no such capability. If so, it may be advantageous to differentiate between those UEs having the capability to interpret, or decode, the compressed MAC RAR(s) and those UEs that don't have this capability. If this is the case, the different UEs could, as a mere example, be differentiated using preamble set division or using PRACH set division. That is, some preambles may be reserved for those UEs having the capability to interpret, or decode, the compressed MAC RAR(s). Alternatively, some specific UL subframes are reserved for those UEs having the capability to interpret, or decode, the compressed MAC RAR(s). Similarly, some preambles and/or UL subframes can be reserved for those UEs that lack this capability. When the radio network node receives a RA MSG1 (see FIG. 1), the radio network node could then check whether or not the UE (from which the radio network node received the RA MSG1) is an UE of the kind having the capability to interpret, or decode, a compressed MAC RAR.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. Rather, the invention is limited only by the accompanying claims and other embodiments than the specific above are equally possible within the scope of the appended claims. For example, while many of the various embodiments have been described mainly with respect to LTE, it will come to mind to one skilled in the art having benefit of the teachings presented in the foregoing description and associated drawings that the general principles and concepts described herein can equally possible be utilized in e.g. UMTS/WCDMA/HSPA. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a radio network node for compressing a Medium Access Control Random Access Response, MAC RAR, of at least two MAC RARs to be transmitted in a single random access response message to at least two User Equipments, UEs, wherein each of said at least two MAC RARs is aiming at a different one of said at least two UEs, the method comprising:
generating a first MAC RAR;
generating a successive MAC RAR by differentially coding one or more bits of a field of the successive MAC RAR to produce a compressed successive MAC RAR;
allocating a first TC-RNTI value, $X_{TC-RNTI1}$, to a first UE;
allocating a second TC-RNTI value, $X_{TC-RNTI2}$, to a second UE; and
establishing a differential relation between the first TC-RNTI value, $X_{TC-RNTI1}$, and the second TC-RNTI value, $X_{TC-RNTI2}$, to be the difference, $X_{TC-RNTI2} - X_{TC-RNTI1}$, between the second TC-RNTI value, $X_{TC-RNTI2}$, and the first TC-RNTI value, $X_{TC-RNTI1}$ and wherein differentially coding one or more bits of said field of the successive MAC RAR to produce the compressed successive MAC RAR comprises differentially coding the one or more bits with respect to the established differential relation between the first TC-RNTI value, $X_{TC-RNTI1}$, and the second TC-RNTI value, $X_{TC-RNTI2}$, and
wherein said fields are Temporary Cell Radio Network Temporary Identifier, TC-RNTI, fields.

2. The method according to claim 1, comprising:
generating an nth MAC RAR by differentially coding one or more bits of a field of the nth MAC RAR to produce an nth compressed MAC RAR, wherein n is an integer greater than two.

3. The method according to claim 2, comprising:
further comprising establishing a relation at a bit level between a field of the nth MAC RAR and a corresponding field of a preceding MAC RAR, and wherein differentially coding one or more bits of said field of the nth MAC RAR to produce the nth compressed MAC RAR comprises differentially coding the one or more bits with respect to the established relation.

4. The method according to claim 1, comprising:
allocating an nth TC-RNTI value, $X_{TC-RNTI(n)}$, to an nth UE,
establishing a differential relation between a TC-RNTI value, $X_{TC-RNTI(n-1)}$, and the nth TC-RNTI value, $X_{TC-RNTI(n)}$, to be the difference, $X_{TC-RNTI(n)} - X_{TC-RNTI(n-1)}$, between the nth TC-RNTI value, $X_{TC-RNTI(n)}$, and preceding TC-RNTI value, $X_{TC-RNTI(n-1)}$ and wherein differentially coding one or more bits of said field of an nth MAC RAR to produce an nth compressed MAC RAR comprises differentially coding the one or more bits with respect to the established differential relation between the nth TC-RNTI value, $X_{TC-RNTI(n)}$, and the preceding TC-RNTI value, $X_{TC-RNTI(n-1)}$, and
wherein n is an integer greater than two.

5. The method according to claim 1, comprising:
allocating said TC-RNTI values in a sequential order.

6. The method according to claim 1, comprising:
allocating said TC-RNTI values in a sequential order by incrementing each successive TC-RNTI value by a value of one.

7. The method according to claim 1, further comprising:
transmitting, to the at least two UEs, the single random access message comprising the first MAC RAR and the successive MAC RAR.

8. A method performed by a radio network node for compressing a Medium Access Control Random Access Response, MAC RAR, of at least two MAC RARs to be transmitted in a single random access response message to at least two User Equipments, UEs, wherein each of said at least two MAC RARs is aiming at a different one of said at least two UEs, the method comprising:
generating a first MAC RAR;
generating a successive MAC RAR by differentially coding one or more bits of a field of the successive MAC RAR to produce a compressed successive MAC RAR;
allocating a first resource block start position, $RB_1$, to a first UE;
allocating a second resource block start position, $RB_2$, to a second UE; and
establishing a differential relation between the first resource block start position, $RB_1$, and the second resource block start position, $RB_2$, to be the difference, $RB_2 - RB_1$, between the second resource block start position, $RB_2$, and the first resource block start position, $RB_1$, and wherein differentially coding one or more bits of said field of the successive MAC RAR to produce the compressed successive MAC RAR comprises differentially coding the one or more bits with respect to the established differential relation between the first resource block start position, $RB_1$, and the second resource block start position, $RB_2$, and
wherein said fields are Uplink, UL, Grant fields.

9. The method according to claim 8, comprising:
allocating an nth resource block start position, $RB_{(n)}$, to an nth UE; and
establishing a differential relation between a preceding resource block start position, $RB_{(n-1)}$, and the nth resource block start position, $RB_{(n)}$, to be the difference, $RB_{(n)} - RB_{(n-1)}$, between the nth resource block start position, $RB_{(n)}$, and the preceding resource block start position, $RB_{(n-1)}$, and wherein differentially coding one or more bits of said field of the nth MAC RAR to produce the compressed nth MAC RAR comprises differentially coding the selected bits with respect to the established differential relation between n:th resource block start position, $RB_{(n)}$, and preceding resource block start position, $RB_{(n-1)}$, and
wherein n is an integer greater than two.

10. The method according to claim 8, comprising:
allocating a same amount of resource blocks (RBs) to the at least two UEs.

11. The method according to any claim 8, comprising:
allocating said resource block positions in a sequential order.

12. The method according to claim 8, comprising:
allocating said resource block positions in a sequential order by incrementing each successive resource block position by a value of one.

13. A radio network node for compressing a Medium Access Control Random Access Response, MAC RAR, of at least two MAC RARs to be transmitted in a single random access response message to at least two User Equipments, UEs, wherein each of said at least two MAC RARs is aiming at a different one of said at least two UEs, the radio network node comprising:
a processor; and
a memory storing computer program code which, when run in the processor, causes the radio network node to:
generate a first Medium Access Control Random Access Response, MAC RAR;
generate a successive MAC RAR by differentially coding one or more bits of a field of the successive MAC RAR to produce a compressed successive MAC RAR;
allocate a first TC-RNTI value, $X_{TC\text{-}RNTI1}$, to a first UE;
allocate a second TC-RNTI value, $X_{TC\text{-}RNTI2}$, to a second UE; and
establishing a differential relation between the first TC-RNTI value, $X_{TC\text{-}RNTI1}$, and the second TC-RNTI value, $X_{TC\text{-}RNTI2}$, to be the difference, $X_{TC\text{-}RNTI2} - X_{TC\text{-}RNTI1}$, between the second TC-RNTI value, $X_{TC\text{-}RNTI2}$, and the first TC-RNTI value, $X_{TC\text{-}RNTI1}$ and wherein differentially coding one or more bits of said field of the successive MAC RAR to produce the compressed successive MAC RAR comprises differentially coding the one or more bits with respect to the established differential relation between the first TC-RNTI value, $X_{TC\text{-}RNTI1}$, and the second TC-RNTI value, $X_{TC\text{-}RNTI2}$, and
wherein said fields are Temporary Cell Radio Network Temporary Identifier, TC-RNTI, fields.

14. The radio network node according to claim 13, wherein the memory stores computer program code which, when run in the processor, causes the radio network node to allocate said TC-RNTI values in a sequential order.

15. The radio network node according to claim 13, wherein the radio network node is an evolved NodeB.

* * * * *